United States Patent [19]

Musikas et al.

[11] Patent Number: 5,132,092
[45] Date of Patent: Jul. 21, 1992

[54] PROCESS FOR THE EXTRACTION OF URANIUM (VI) AND/OR PLUTONIUM (IV) PRESENT IN AN ACID AQUEOUS SOLUTION BY MEANS OF A MIXTURE OF N,N-DIALKYL AMIDES USABLE FOR THE REPROCESSING OF IRRADIATED NUCLEAR FUELS

[75] Inventors: Claude Musikas, Bures/Yvette; Philippe Zorz, Bagnols/Ceze, both of France

[73] Assignee: Commissariat a l'Energie Atomique, Paris, France

[21] Appl. No.: 467,943

[22] Filed: Jan. 22, 1990

[30] Foreign Application Priority Data

Feb. 1, 1989 [FR] France ................. 89 01282

[51] Int. Cl.$^5$ .............. C01G 56/00; C01G 43/00
[52] U.S. Cl. ........................ 423/9; 252/631; 252/626
[58] Field of Search ............ 423/2, 9; 252/625, 626, 252/631

[56] References Cited

U.S. PATENT DOCUMENTS

| | | | |
|---|---|---|---|
| 4,548,790 | 10/1985 | Horwitz et al. | 423/9 |
| 4,572,802 | 2/1986 | Hubert et al. | 534/12 |
| 4,574,072 | 3/1986 | Horwitz et al. | 423/9 |
| 4,770,807 | 9/1988 | Musikas et al. | 252/184 |
| 4,772,429 | 9/1988 | Descouls et al. | 252/625 |
| 4,938,871 | 7/1990 | Musikas et al. | 210/634 |

FOREIGN PATENT DOCUMENTS 0228940 7/1987 European Pat. Off.
816628 7/1959 United Kingdom.
1154875 6/1969 United Kingdom.

OTHER PUBLICATIONS

Cleveland J. M., The Chemistry of Plutonium, 1970, pp. 250–251.

Primary Examiner—Brooks H. Hunt
Assistant Examiner—Ngoclan T. Mai
Attorney, Agent, or Firm—Pearne, Gordon, McCoy & Granger

[57] ABSTRACT

The invention relates to a process for the extraction of uranium (VI) and/or plutonium (IV) present in an acid aqueous solution by means of a mixture of N,N-dialkyl amides usable for the reprocessing of irradiated nuclear fuels.

In (50 or 52) contacting takes place between an aqueous solution containing U(VI) and Pu(IV) and an organic solvent incorporating a mixture of two N,N-dialkyl amides, e.g. of formulas:

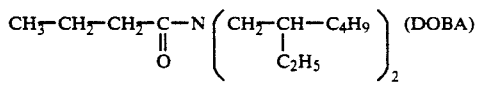

and

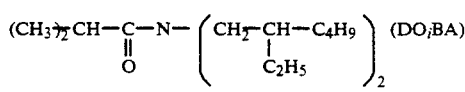

and then by separating (in 50 or 52) the organic solvent containing either U(VI) and Pu(IV), or U(VI).

9 Claims, 6 Drawing Sheets

PROCESS FOR THE EXTRACTION OF URANIUM (VI) AND/OR PLUTONIUM (IV) PRESENT IN AN ACID AQUEOUS SOLUTION BY MEANS OF A MIXTURE OF N,N-DIALKYL AMIDES USABLE FOR THE REPROCESSING OF IRRADIATED NUCLEAR FUELS

The present invention relates to a process for the extraction of U(VI) ions and/or Pu(IV) ions present in an acid aqueous solution by means of mixtures of N,N-dialkyl amides. It more particularly applies to the extraction of uranium (VI) and possibly plutonium (IV) present in nitric dissolving solutions, obtained in the first stage of the reprocessing of irradiated nuclear fuels and to the separation of the uranium and the plutonium without modifying the degree of oxidation of the plutonium.

One of the standard practices for reprocessing irradiated nuclear fuels is to firstly dissolve the fuel in a nitric solution, followed by the treatment of said solution by extraction using an organic solvent for separating the uranium and plutonium from the fission products, followed by the separation of the uranium from the plutonium.

For the first extraction operation, it is normal to use an organic solvent constituted by tributyl phosphate and the uranium is then separated from the plutonium extracted in the organic solvent by contacting the latter with a nitric aqueous solution containing reducing agents in order to reduce the plutonium (IV) into plutonium (III) and for then passing it into aqueous solution.

This process which is widely used on the industrial scale suffers from a certain number of disadvantages linked with the use of tributyl phosphate as the extractant.

In addition, research has been carried out for finding other organic solvents able to extract or separate uranium and plutonium. As a result of this research, the possibility of using amides has been studied and FR-A-2 591 213 discloses a process for the simultaneous extraction of uranium (VI) and plutonium (IV) or the separation of uranium (VI) from plutonium (IV) using as the extractant N,N-dialkyl amides of formula:

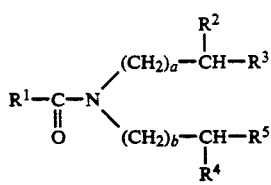

in which $R^1$, $R^2$, $R^3$, $R^4$ and $R^5$ are straight or branched alkyl radicals and a and b are integers between 1 and 4.

The aforementioned Patent shows that N,N-dialkyl amides according to the above formula with $R^1$ being a straight-chain radical are more suitable for the simultaneous extraction of uranium and plutonium, whereas N,N-dialkyl amides in which $R^1$ is a branched alkyl radical are more suitable for the separation of uranium and plutonium.

The results obtained in both cases are satisfactory. Nevertheless, it would be of interest to be able to improve these, particularly with a view to decreasing the number of plutonium and uranium purification cycles in an irradiated nuclear fuel reprocessing installation.

The present invention relates to a process for the extraction of uranium (VI) and/or plutonium (IV) present in an aqueous solution by means of a mixture of N,N-dialkyl amides and which makes it possible to achieve this improvement.

The invention therefore specifically relates to a process for the separation of uranium (VI) and/or plutonium (IV) from an aqueous solution, which is characterized in that:

1) the aqueous solution is contacted with an organic solvent comprising:

a first N,N-dialkyl amide of formula:

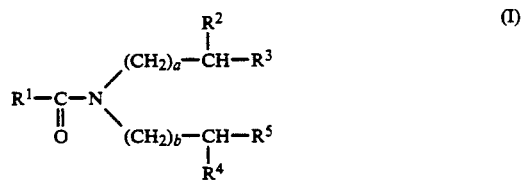

in which $R^1$ is a straight-chain alkyl radical with 1 to 12 carbon atoms or a H radical, $R^2$ and $R^4$, which can be the same or different, are straight or branched alkyl radicals with 2 to 4 carbon atoms, $R^3$ and $R^5$, which can be the same or different, are straight or branched alkyl radicals with 1 to 6 carbon atoms and a and b, which can be the same or different, are integers between 1 and 6 and a second N,N-dialkyl amide of formula:

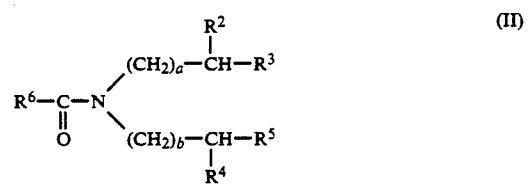

in which $R^2$, $R^3$, $R^4$, $R^5$ a and b have the meanings given hereinbefore and $R^6$ is a branched alkyl radical with 3 to 12 carbon atoms and 2) the organic solvent containing the uranium (VI) and/or the plutonium (IV) is separated from the aqueous solution.

The inventive process makes advantageous use of the fact that by using a mixture of two N,N-dialkyl amides disclosed in French Patent FR-A-2 591 213, but by choosing a first N,N-dialkyl amide with a branched alkyl radical and a second N,N-dialkyl amide with a straight alkyl radical, better results are obtained in connection with the separation of uranium (VI) from plutonium (IV). The coextraction Pu(IV) U(VI) by the mixtures is improved on comparing it with the expected extraction by adding the extracting powers of the pure extractants. This is probably due to synergism between the two N,N-dialkyl amides.

Generally, the aqueous solution containing the uranium (VI) and/or the plutonium (IV) is a nitric solution and in the case where said solution simultaneously contains uranium (VI) and plutonium (IV), it is possible to use the process either for simultaneously extracting uranium (VI) and plutonium (IV) or for separating the uranium (VI) from the plutonium (IV).

Moreover, according to a first embodiment of the inventive process, the nitric acid concentration of the aqueous solution incorporating uranium (VI) and plutonium (IV) is adjusted to a value of 2 to 8 mole/l for simultaneously extracting uranium (VI) and plutonium (IV) in the organic solvent.

According to a second embodiment of the inventive process, the nitric acid concentration of the aqueous solution incorporating uranium (VI) and plutonium (IV) is adjusted to a value of 0.1 to 2 mole/l for selectively extracting the uranium (VI) in the organic solvent and for separating it from the plutonium (IV).

This possibility of using the same mixture of N,N-dialkyl amides for simultaneously extracting or separating uranium (VI) from plutonium (IV), by acting on the acidity of the aqueous solution, can more particularly be used for the reprocessing of irradiated nuclear fuels. In this case, it is possible to carry out the first cycle of separating the uranium and plutonium from the fission products by means of said solvent and then separate the uranium and plutonium from the U and Pu-containing solvent.

The invention also relates to a process for the treatment of an aqueous nitric solution containing uranium (VI) and plutonium (IV) and fission products, which comprises the following successive stages:

1) simultaneous extraction of the uranium (VI) and plutonium (IV) in an organic solvent incorporating a first N,N-dialkyl amide of formula (I) and a second N,N-dialkyl amide of formula (II) and 2) separation of the plutonium present in the organic solvent obtained at the end of the first stage by contacting said solvent with a nitric aqueous solution with a nitric acid concentration of 0.1 to 2 mole/l for reextracting the plutonium in the aqueous nitric solution.

The possibility of carrying out this uranium-plutonium separation without having to reduce the plutonium is very interesting, because it avoids the numerous problems resulting from the introduction of reducing agents such as hydrazine and hydroxylamine.

This process can also comprise a third stage of reextracting the uranium by contacting the organic solvent obtained at the end of the second stage with a nitric aqueous solution having a nitric acid concentration of 0 to 0.2 mole/l.

In the N,N-dialkyl amides of formulas (I) and (II) used in the invention, $R^2$ and $R^4$ are preferably the ethyl radical and a and b are preferably identical and equal to 1.

For example, the first N,N-dialkyl amide complies with the formula:

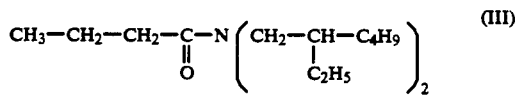

(III)

and the second N,N-dialkyl amide complies with the formula:

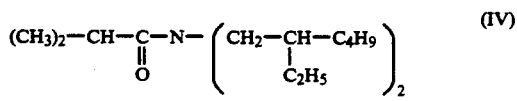

(IV)

In order to obtain good results with the same solvent for the simultaneous extraction of uranium (VI) and plutonium (IV) and the separation of uranium (VI) from plutonium (IV), the molar ratio of the first N,N-dialkyl amide to the second N,N-dialkyl amide is 0.1 to 10.

Generally, the total N,N-dialkyl amide concentration of the organic solvent is in the range 0.2 to 1.7 mole/l.

The N,N-dialkyl amide used in the invention can be prepared by conventional processes, e.g. by reacting acid chloride of formula:

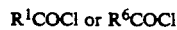

with the secondary amine of formula:

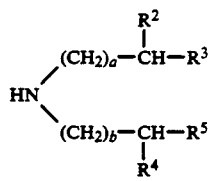

in which $R^1$, $R^2$, $R^3$, $R^4$, $R^5$, $R^6$ a and b have the meanings given hereinbefore and as described in FR-A-2 591 213.

The organic solvents used in the invention generally comprise an inert organic diluent. Examples of such diluents are aromatic carbides such as benzene, xylene, mesitylene, tert. butyl benzene, alcohols such as decanol and aliphatic hydrocarbons, more particularly straight or branced-chain, saturated hydrocarbons. The preferred diluent used according to the invention is an aliphatic hydrocarbon, especially a branched or straight, saturated hydrocarbon, such as dodecane or hydrogenated tetrapropylene (HTP).

The process according to the invention can be performed using standard equipment making it possible to bring about under good conditions the contacting of the aqueous solution with the organic solvent and its separation. Examples of such equipment are extraction columns, mixer-settler batteries, pulsed columns, centrifugal extractors, etc.

Normally working takes place at ambient temperature and pressure with aqueous phase/organic phase volume ratios between 10 and 0.1.

BRIEF DESCRIPTION OF THE DRAWINGS

The invention is described in greater detail hereinafter in non-limitative, exemplified manner with reference to the attached drawings, wherein show.

In the following examples the organic solvent is constituted by a mixture of DOBA, namely N,N-dialkyl amide of formula (III)

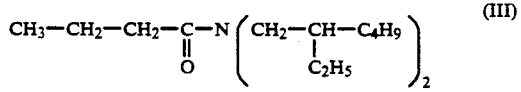

and $DO_iBA$, namely N,N-dialkyl amide of formula (IV)

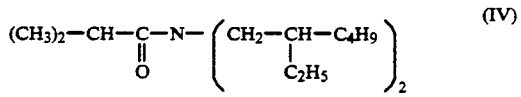

diluted in hydrogenated tetrapropylene (HTP).

EXAMPLE 1

This example uses an organic solvent constituted by HTP containing 1 mole/l of $DO_iBA$ and 0.5 mole/l of DOBA for treating a 1N nitric acid aqueous solution containing 1 g/l of uranium (VI) and 100 mg/l of plutonium (IV).

One volume of the aqueous solution is contacted with one volume of the organic solvent. After stirring for 5 min, the two phases are separated by settling and their respective uranium (VI) and plutonium (IV) contents are measured by colorimetry. From this are deduced the uranium (VI) and plutonium (IV) distribution coefficients corresponding to the ratio of the concentration of U(VI) or Pu(IV) in the organic phase to the concentration of said same element in the aqueous phase.

A series of experiments is carried out in the same way, but varying the DOBA concentration of the mixture from 0 to 0.6 mole/l, whilst keeping the $DO_iBA$ concentration at 1 mole/l.

Figure 1:
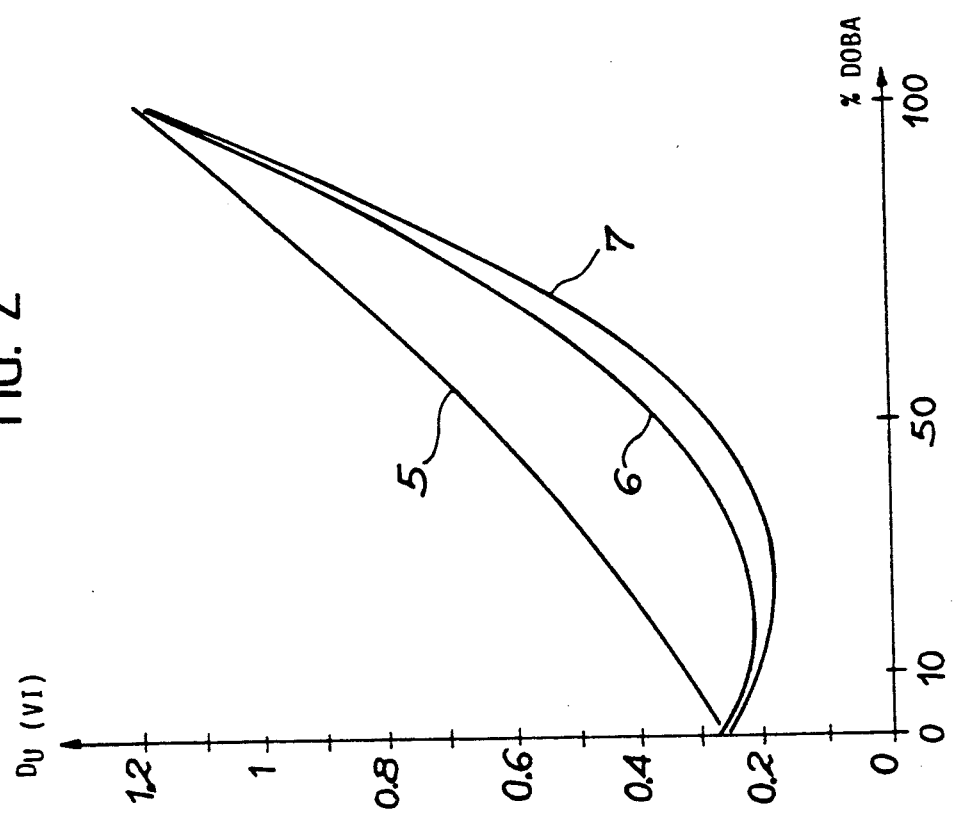
FIG. 1 a graph showing the distribution coefficients of the U(VI) and Pu(IV) ions between the 1N HNO₃ aqueous phases and the organic phases containing DO₁BA to which is added up to 0.6 mole of DOBA as a function of the concentration of the latter.

The results obtained are given in FIG. 1, which shows the variations of the U(VI) and Pu(IV) distribution coefficients as a function of the DOBA concentration in mole/l.

In FIG. 1, the continuous line curves relate to uranium (VI) and the broken line curves to plutonium (IV). Moreover, curves 1 and 2 correspond to the results obtained in this series of experiments, whereas curves 3 and 4 correspond to results obtained by calculation from U(VI) and Pu(IV) distribution coefficients in DOBA only or $DO_iBA$ only, assuming that the affinity of the mixture for metal ions is the sum of the affinities of the extractants taken separately.

On the basis of FIG. 1, it can be seen that the results obtained with the mixture are much better than the calculated results, which shows that there is a synergism between the two extractants.

EXAMPLE 2

This example relates to the extraction of uranium (VI) by a solvent incorporating DOBA and $DO_iBA$ with a total amide concentration (DOBA+$DO_iBA$) of 1.025 mole/l in HTP, but with different DOBA/$DO_iBA$ proportions.

In this example the aqueous solution is a 1N nitric acid solution containing $5 \times 10^{-2}$ mole/l of uranium (VI).

The operating conditions are the same as in example 1 and, at the end of the operation, the uranium (VI) distribution coefficients are determined.

Figure 2:
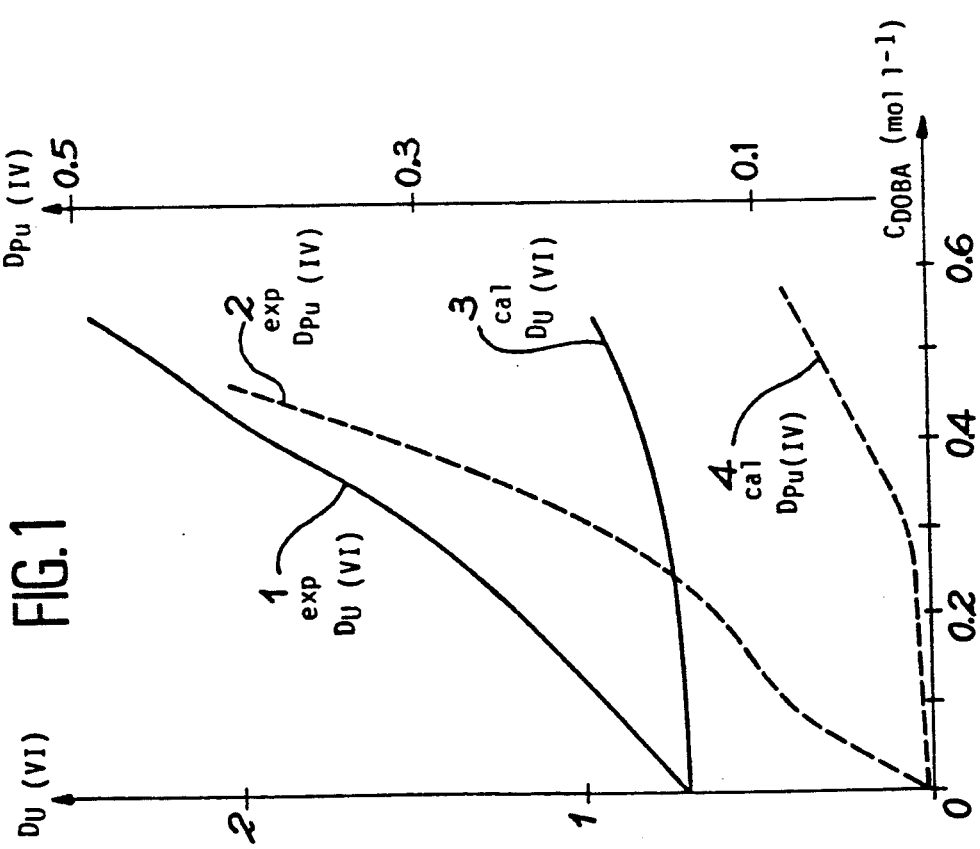
FIG. 2 a graph showing the variations of the distribution coefficient of U(VI) between a nitric aqueous phase and an organic solvent constituted by a mixture of DOBA and DO₁BA as a function of the DOBA percentage.

The results obtained are given in FIG. 2, which is a graph showing the variations of the uranium (VI) distribution coefficient as a function of the molar DOBA percentage in the DOBA-$DO_iBA$ mixture. Curve 5 relates to the results obtained in this experiment and curves 6 and 7 to curves obtained by calculation according to the two following hypotheses.

It is assumed for curve 7 that the distribution coefficients $D_M$ of the mixtures are the sum of the distribution coefficients of the extractants considered separately, namely $D_M$ mixture = $D_M$DOBA + $D_M DO_iBA$.

For curve 6 it is assumed that the distribution coefficients of the mixture are the sum of the distribution coefficients of the extractants taken separately, but taking account of the fact that the extraction medium of the mixture is equivalent to a medium, whose amide concentration is that of the mixture. In this case, the distribution coefficients of the extractants taken separately are calculated in the manner indicated by the following equations (2) and (3):

$$\log D_M'^{DOBA} = \log D_M^{DOBA(mixture)} + 2 \log C_{DOBA} - 2 \log C_{mixture} \quad (2)$$

$$\log D_M'^{DO_iBA} = \log D_M^{DO_iBA(mixture)} + 2 \log C_{DO_iBA} - 2 \log C_{mixture} \quad (3)$$

The distribution coefficient of the mixture is given by equation (4).

$$D_M^{mixture} = D_M'^{DOBA} + D_M'^{DO_iBA} \quad (4)$$

On the basis of FIG. 2, the distribution coefficients found in this experiment are higher than those evaluated by calculation according to the two preceding hypotheses.

EXAMPLE 3

This example illustrates the use of a mixture of DOBA and $DO_iBA$ with a total concentration of 1 mole/l in HTP for the extraction of the plutonium (IV) present in a 1N nitric aqueous solution containing 0.1 g/l of Pu(IV) and whilst varying the molar DOBA proportions in the mixture.

The operating conditions are the same as in example 2 and at the end of the operation the plutonium (IV) concentrations of the aqueous solution and organic solvent are determined.

Figure 3:
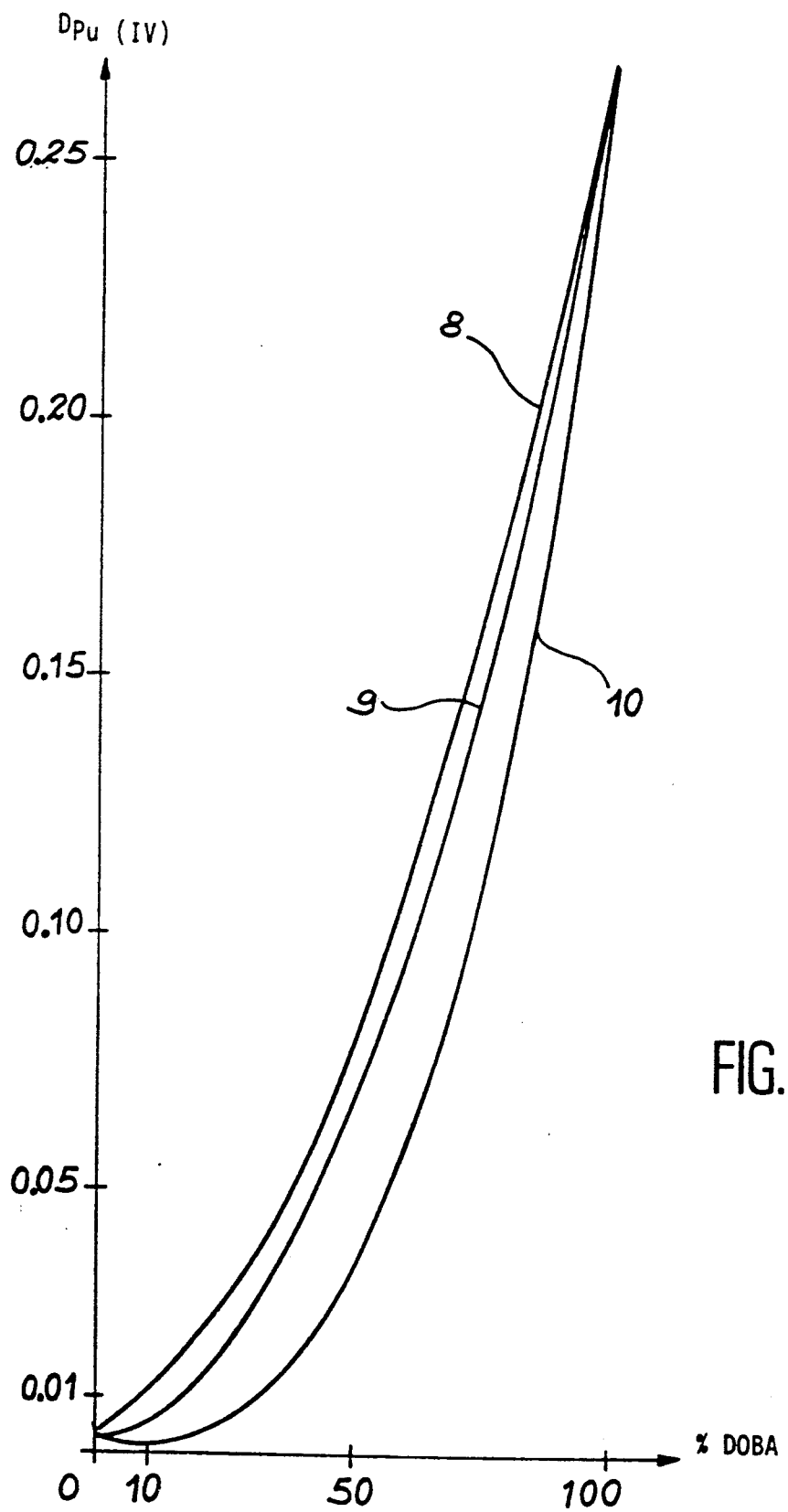
FIG. 3 a graph showing the variations of the Pu(IV) distribution coefficient between a nitric aqueous phase and an organic solvent comprising a mixture of DOBA and DO₁BA as a function of the DOBA content of the mixture.

The results obtained are given in FIG. 3, which represents the variations of the plutonium (IV) distribution coefficient as a function of the molar DOBA percentage in the DOBA-$DO_iBA$ mixture.

In FIG. 3 curve 8 refers to the results obtained in this experiment, whereas curve 9 corresponds to estimates made in the same hypothesis as curve 6 and curve 10 to estimates made in the same hypothesis as curve 7 in FIG. 2. Thus, the distribution coefficient of plutonium (IV) is slightly better than the calculated values, but the improvement is significantly less than that in the case of uranium (VI).

It is assumed that in the case of uranium (VI), there is a new complex probably of formula $UO_2(NO_3)_2$ DOBA, $DO_iBA$, whose stability is greater than that of the complexes UO$_2$(NO$_3$)$_2$(DOBA)$_2$ and UO$_2$(NO$_3$)$_2$(DO$_i$BA)$_2$. This hypothesis was confirmed by ultraviolet spectrometry of an organic solvent containing 0.5 mole/l of DOBA, 0.5 mole/l of DO$_i$BA and uranium (VI). The spectrum obtained is shown in FIG. 4.

Figure 4:
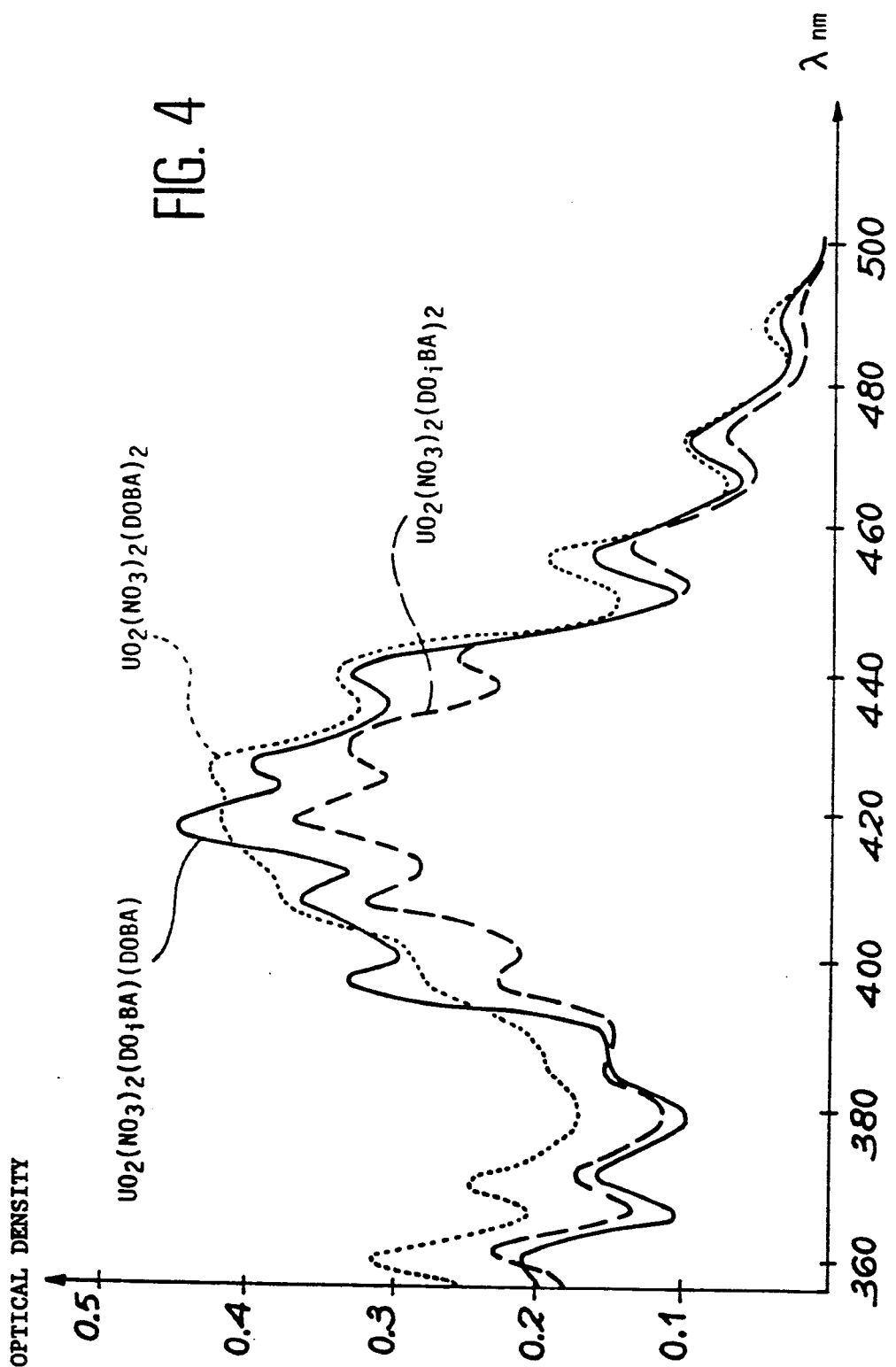
FIG. 4 a graph showing the visible ultraviolet spectrum of the complexes of uranium (VI) in a mixture of DOBA and DO₁BA.

FIG. 4 makes it clear that there is a first spectrum in continuous line form corresponding to the complex UO$_2$(NO$_3$)$_2$(DO$_i$BA) (DOBA), a second spectrum in dotted line form corresponding to the complex UO$_2$(NO$_3$)$_2$(DOBA)$_2$ and a third spectrum in broken line form corresponding to the complex UO$_2$(NO$_3$)$_2$(DO$_i$BA)$_2$. In this solution, the proportion of the complexes UO$_2$(NO$_3$)$_2$(DOBA)$_2$, UO$_2$(NO$_3$)$_2$(DO$_i$BA)$_2$ and UO$_2$(NO$_3$)$_2$(DOBA)(DO$_i$BA) are respectively 43.7, 10.8 and 45.5%.

However, in the case of plutonium (IV), the spectrum of a solvent incorporating a mixture of DOBA and DO$_i$BA is identical to that of a solvent only containing DOBA, which demonstrates that for a moderate acidity, the complex present is Pu(NO$_3$)$_4$(DOBA)$_2$, DO$_i$BA only serving to modify the organic medium. In this case, there is a medium effect corresponding to the fact that the increase of the DOBA concentration induces increases in the distribution coefficient higher than those expected by the stoichiometry of the complexes.

EXAMPLES 4 TO 13

These examples adopt the same operating procedure as in example 1 for extracting uranium (VI) and possibly plutonium (IV) from nitric aqueous solutions containing uranium (VI) and plutonium (IV) and using an organic solvent constituted by a mixture of DO$_i$BA and DOBA diluted in HTP with different DO$_i$BA and DOBA contents. The results and conditions used in these examples are given in table 1.

EXAMPLE 14

This example illustrates the use of the process according to the invention for treating a nitric solution containing uranium, plutonium and fission products resulting from the dissolving of irradiated fuels in a light water reactor at 33,000 MWJ.t$^{-1}$.

Figure 5:
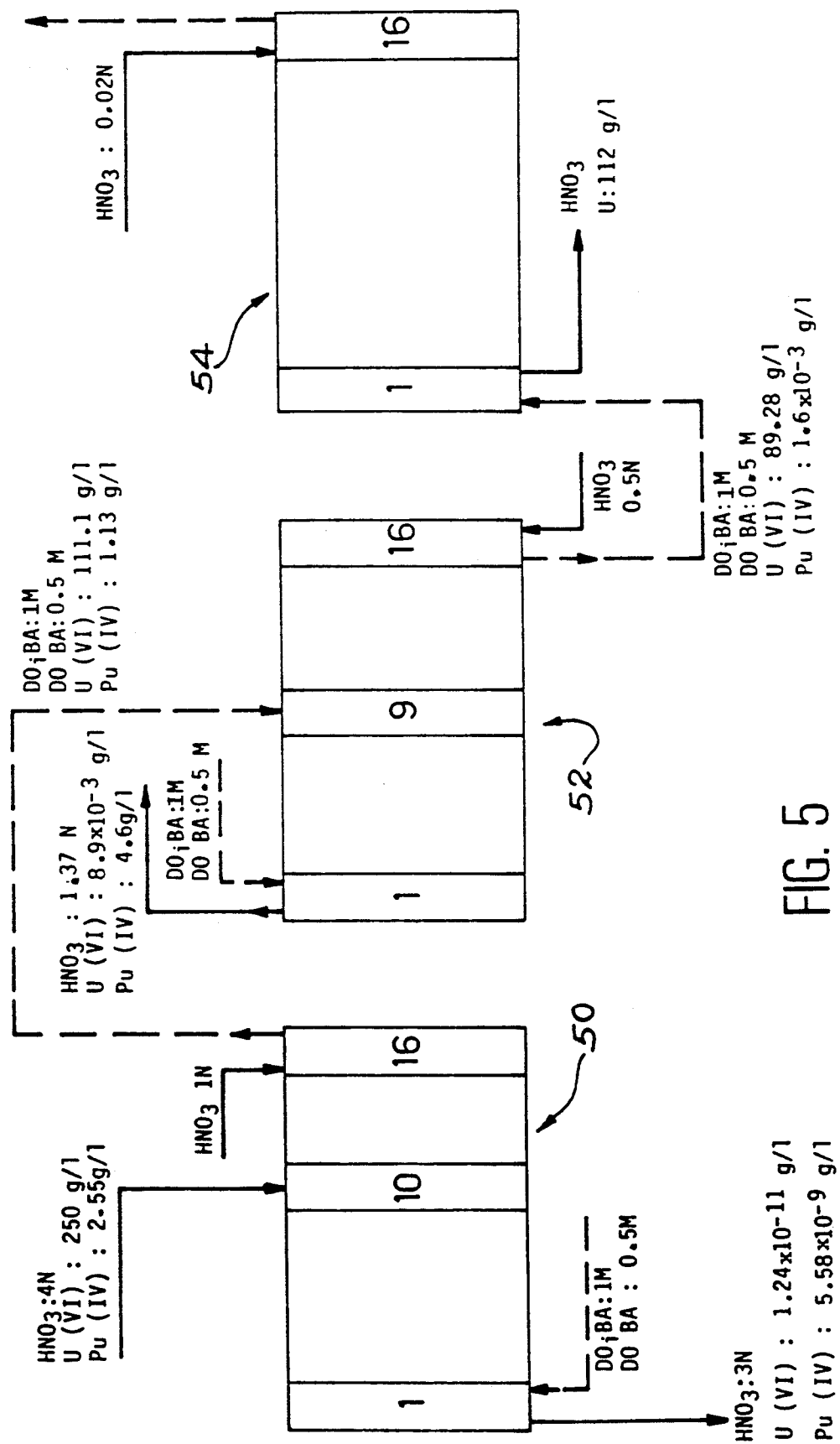
FIG. 5 a diagram of an installation having a uranium and plutonium extraction battery a uranium/plutonium separation battery and a uranium reextraction battery.

For this treatment, use is made of the installation diagrammatically shown in FIG. 5, which comprises a first battery (50) of 16 mixer-settler units used for the simultaneous extraction of uranium and plutonium, a second battery (52) of 16 mixer-settler units used for separating uranium and plutonium and a third battery (54) of 16 mixer-settler units used for the reextraction of the uranium in a nitric solution.

This installation uses as the solvent a mixture of 1 mole/l DO$_i$BA and 0.5 mole/l DOBA in HTP, which is introduced into the first stage of extraction battery (50).

The aqueous solution resulting from the dissolving of the irradiated fuel is a 4N nitric solution comprising 250 g/l of uranium (VI), 2.55 g/l of Pu(IV) and it is introduced into the tenth stage of battery (50), whilst the 1N nitric acid is introduced into the sixteenth stage to be used for the washing of the fission products of the organic solvent leaving the tenth stage.

This diagram shows in continuous line form the circulation of the aqueous solutions and in broken line form the circulation of the organic solvent.

The following flow rates are used in the first extraction battery (50):

0.21.h$^{-1}$ for the 1N nitric acid introduced into the sixteenth stage, 1.0L.h$^{-1}$ for the aqueous solution introduced into the tenth stage and 2.25L.h$^{-1}$ for the organic solvent introduced into the first stage.

Thus, extraction is carried out with an organic solvent/aqueous solution volume ratio of 1.87 and washing is carried out with an organic solvent/aqueous solution ratio of 11.25.

On leaving the extraction battery (50) an organic solvent is collected, which contains 111.1 g/l of uranium (VI) and 1.13 g/l of plutonium (IV) which is introduced into the ninth stage of the uranium-plutonium separation battery (52). Into the sixteenth stage of this battery is introduced a 0.5N nitric solution, whilst into its first stage is introduced pure organic solvent for washing the uranium. The following flow rates are used:

0.55L.h$^{-1}$ for the 0.5N nitric solution of the sixteenth stage, 2.25L.h$^{-1}$ for the organic solvent introduced into the ninth stage and 0.55L.h$^{-1}$ for the pure organic solvent introduced into the first stage.

Thus, separation is carried out with an organic solvent/aqueous solution ratio of 5.1 and washing with an organic solvent/aqueous solution ratio of 1.

On leaving the uranium-plutonium separation battery (52) in in the sixteenth stage is recovered organic solvent containing 89.28 g/l of uranium (VI) and 1.6 mg/l of plutonium (IV) and in the first stage is collected a 1.37N nitric acid aqueous solution containing 4.6 g/l of plutonium (IV) and 8.9 mg/l of uranium (VI).

Thus, a maximum plutonium (IV) concentration is obtained on leaving the first stage, whilst avoiding any plutonium acculumation greater than 10 g/l in the intermediate stages. The uranium, plutonium and HNO$_3$ concentrations of the aqueous and organic solutions circulating in each of the stages of batteries (50) and (52), as well as the flow rates are given respectively in tables 2 and 3. Table 2 shows that the plutonium leakage or loss is below 0.1 mg/l after 6 extraction stages.

Thus 4.6 g/l of plutonium (IV) is obtained in 1.4M HNO$_3$ medium containing less than 10 mg/l of uranium (FD=4.6×10$^4$) and 89 g/l of uranium (VI) containing less than 2 mg/l of plutonium (FD=4.4×10$^2$).

On leaving the uranium-plutonium separation battery (52), the organic solvent is introduced into the first stage of the uranium reextraction battery (54), whilst a 0.02N nitric solution is introduced into the sixteenth stage at a rate of 1.12 l/h.

The information in tables 2 and 3 show that it is possible to use the DOBA-DO$_i$BA mixture for carrying out successively the simultaneous extraction of uranium and plutonium, as well as uranium-plutonium separation.

Figure 6:
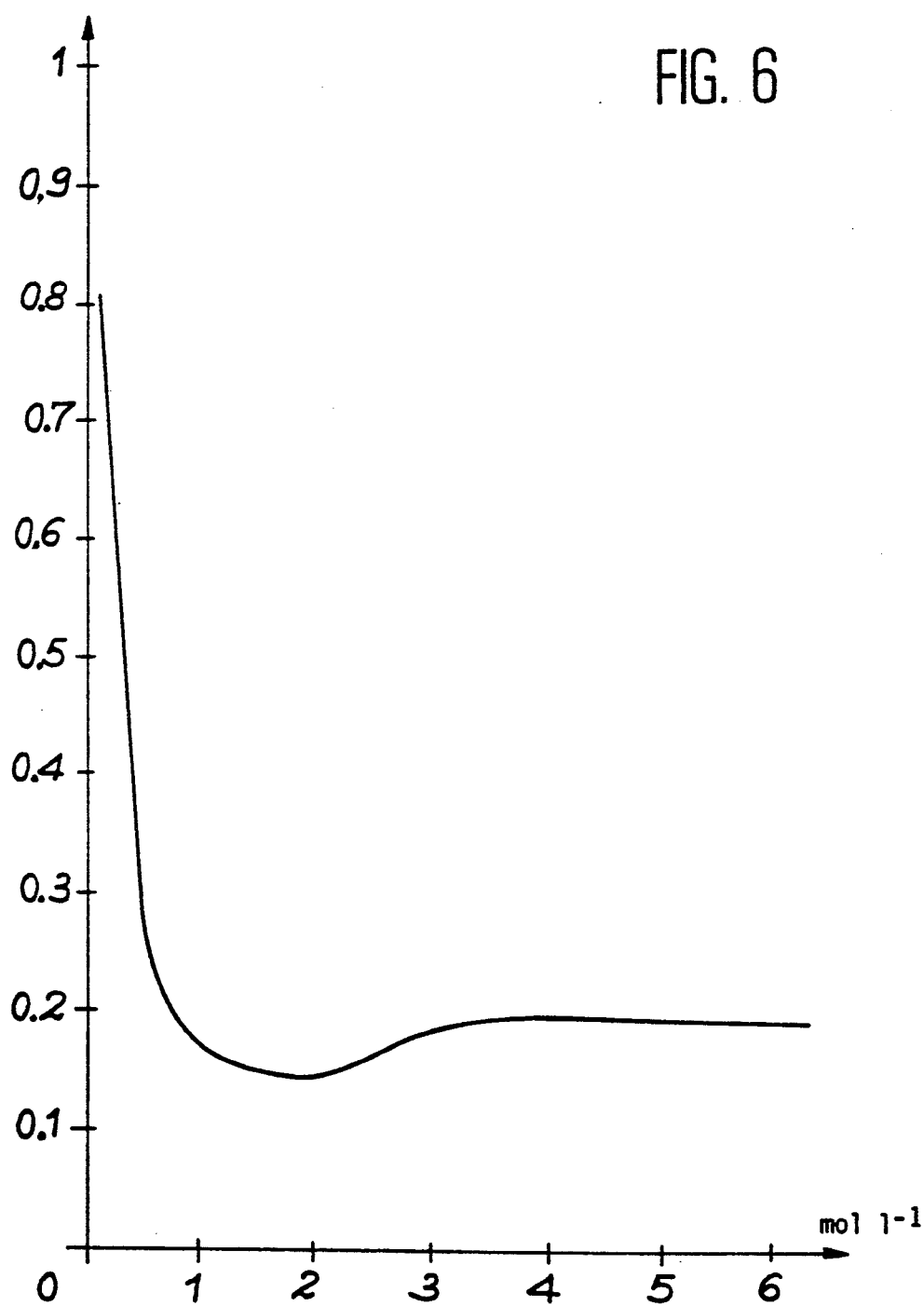
FIGS. 6 to 8 graphs, showing the variations of the distribution coefficients of fission products such as Tc, Zr and Ru between a nitric solution and the organic solvent according to the invention as a function of the nitric acid concentration.
Figure 7:
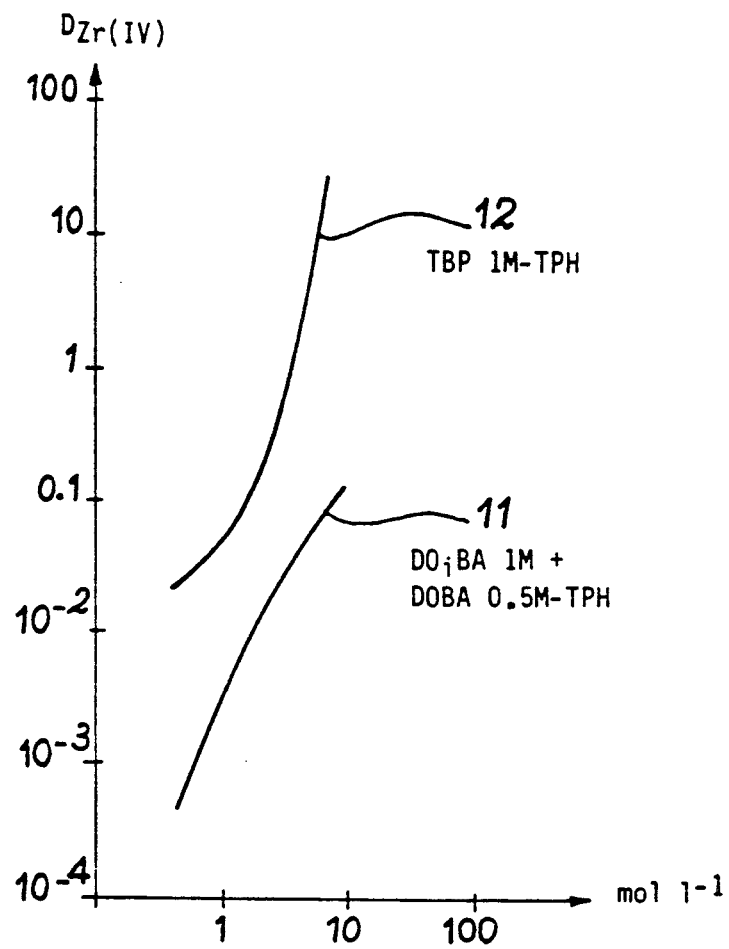
Figure 8:
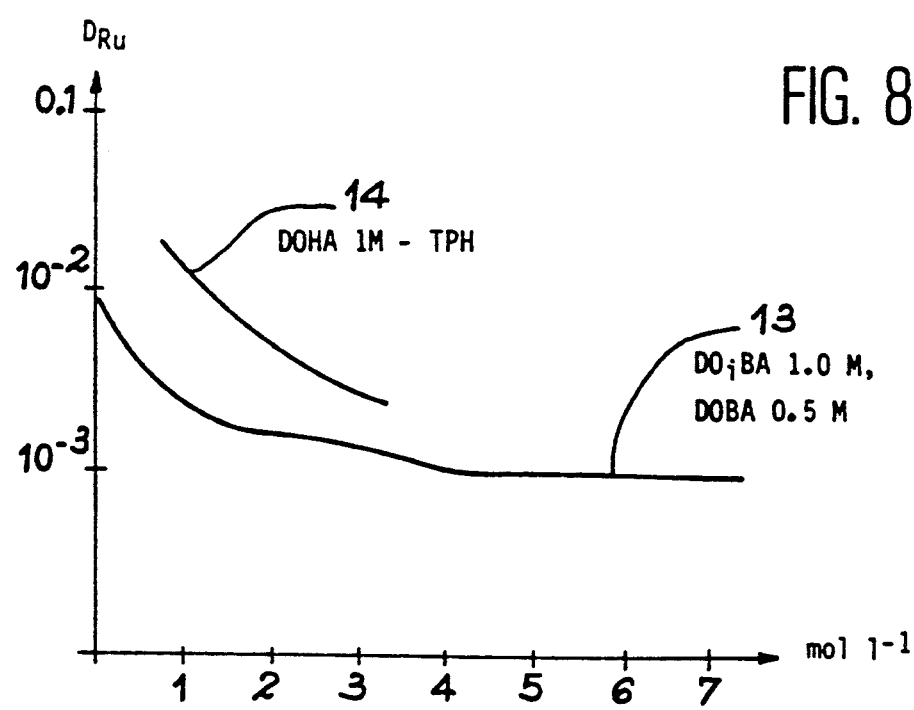

In extraction battery (50) a good decontamination rate of fission products such as technetium, zirconium (IV) and ruthenium is obtained, as demonstrated by FIGS. 6, 7 and 8. The latter respectively show the variations of the distribution coefficients of Tc, Zr(IV) and Ru as a function of the nitric acid concentration of an aqueous solution containing Tc, Zr(IV) or Ru. These coefficients were obtained by contacting one volume of a nitric aqueous solution containing 10$^{-10}$ mole/l of Tc in the form TcO$_4^-$, 10$^{-3}$ mole.l$^{-1}$ of Zr(IV) or 10$^{-3}$ mole.l$^{-1}$ of Ru with one volume of a mixture of 1M DO$_i$BA and 0.5M DOBA in HTP. After stirring for 15 minutes the two phases are separated and their respective technetium, zirconium or ruthenium contents are measured.

FIG. 6 shows that the technetium distribution coefficient is low. It is also lower than that obtained with tributyl phosphate for the same concentration.

FIG. 7 shows that the zirconium(IV) distribution coefficient (curve 11) is lower than that obtained under the same conditions (curve 12) with 1M TBP in HTP.

FIG. 8 shows that the ruthenium distribution coefficient (curve 13) is lower than that obtained (curve 14) with another N,N-dialkyl amide (DOHA) of formula

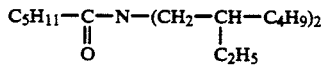

It is also lower than that obtained with 1M TBP in HTP, where $D_{Ru}$ is slightly higher than $10^{-2}$ for a nitric acid concentration of 3 mole/l.

It is also established that the ions $Sr^{2+}$, lanthanides (III) and americium (III) are only slightly extracted by the mixtures according to the invention. Moreover, the $Fe^{3+}$ ions are not transferred into the organic phase, no matter what the acidity of the aqueous medium.

Thus, the use of the mixture of N,N-dialkyl amides according to the invention makes it possible to obtain greater fission product separation factors than with tributyl phosphate. It is consequently possible to reduce the number of plutonium and uranium purification cycles.

The use of the mixture of N,N-dialkyl amides according to the invention consequently leads to the following advantages. A regeneration of the solvent does not require inorganic salts. Thus, the substituents of the carbonyl group of the amides are sufficiently short to envisage regenerations of solvents deteriorated by acid washing, the main hydrolysis and radiolysis product of a N,N-dialkyl amide, $R_2NCOR'$, being the carboxylic acid $R'COOH$. The U(VI)-Pu(IV) separation makes it possible to avoid the complications resulting from the use of reducing agents. The number of purification cycles is reduced due to higher actinide-PF (Zr, Ru) separation coefficients.

TABLE 1

| Ex. | Concentrations of | | | | | | |
|---|---|---|---|---|---|---|---|
| | $HNO_3$ (aq.) mole $l^{-1}$ | U(VI) (org.) g.$l^{-1}$ | $DO_iBA$ mole $l^{-1}$ | DOBA mole $l^{-1}$ | $D_{U(VI)}$ | $D_{Pu(IV)}$ | $\frac{D_{U(VI)}}{D_{Pu(IV)}}$ |
| 4 | 4 | 100 | 1.2 | 0.3 | 2.08 | 0.215 | 9.69 |
| 5 | 4 | 97.4 | 1 | 0.4 | 2.24 | 0.26 | 8.6 |
| 6 | 4 | 98.3 | 1 | 0.45 | 2.38 | 0.32 | 7.4 |
| 7 | 4 | 98.8 | 1 | 0.5 | 2.89 | 0.495 | 5.8 |
| 8 | 4 | 98.3 | 1 | 0.55 | 3.23 | 0.59 | 5.5 |
| 9 | 0.5 | 79.1 | 1 | 0.4 | 0.69 | 0.044 | 15.4 |
| 10 | 0.5 | 79.9 | 1 | 0.45 | 0.70 | 0.052 | 14.2 |
| 11 | 0.5 | 79.7 | 1 | 0.5 | 0.78 | 0.056 | 12.9 |
| 12 | 0.55 | 78.9 | 1 | 0.55 | 0.81 | 0.073 | 11.6 |
| 13 | 0.9 | 78.3 | 1 | 1.02 | 0.086 | | 11.8 |

TABLE 2

| Stage | Concentrations in the stages of battery (50) | | | | | | | |
|---|---|---|---|---|---|---|---|---|
| | U(VI) (aq.) | U(VI) (org.) | Pu(IV) (aq.) | Pu(IV) (org.) | $HNO_3$ (aq.) | $HNO_3$ (org.) | flow rate (aq.) | flow rate (org.) |
| 1 | $1.24 \times 10^{-11}$ | $1.36 \times 10^{-10}$ | $5.58 \times 10^{-9}$ | $1.17 \times 10^{-8}$ | 3.00 | 0.79 | 1.20 | 2.25 |
| 2 | $2.68 \times 10^{-10}$ | $3.52 \times 10^{-9}$ | $2.76 \times 10^{-8}$ | $1.01 \times 10^{-7}$ | 4.50 | 1.13 | 1.20 | 2.25 |
| 3 | $6.62 \times 10^{-9}$ | $8.93 \times 10^{-8}$ | $1.95 \times 10^{-7}$ | $9.22 \times 10^{-7}$ | 5.14 | 1.30 | 1.20 | 2.25 |
| 4 | $1.67 \times 10^{-7}$ | $2.28 \times 10^{-6}$ | $1.73 \times 10^{-6}$ | $9.03 \times 10^{-6}$ | 5.44 | 1.37 | 1.20 | 2.25 |
| 5 | $4.28 \times 10^{-6}$ | $5.88 \times 10^{-5}$ | $1.69 \times 10^{-5}$ | $9.21 \times 10^{-5}$ | 5.59 | 1.41 | 1.20 | 2.25 |
| 6 | $1.10 \times 10^{-4}$ | $1.52 \times 10^{-3}$ | $1.72 \times 10^{-4}$ | $9.58 \times 10^{-4}$ | 5.66 | 1.43 | 1.20 | 2.25 |
| 7 | $2.85 \times 10^{-3}$ | $3.93 \times 10^{-2}$ | $1.79 \times 10^{-3}$ | $1.00 \times 10^{-2}$ | 5.69 | 1.44 | 1.20 | 2.25 |
| 8 | $7.36 \times 10^{-2}$ | 1.013 | $1.88 \times 10^{-2}$ | 0.10 | 5.70 | 1.43 | 1.20 | 2.25 |
| 9 | 1.900 | 23.95 | 0.19 | 0.98 | 5.70 | 1.32 | 1.20 | 2.25 |
| 10 | 44.90 | 115.1 | 1.83 | 1.30 | 5.49 | 0.65 | 1.20 | 2.25 |
| 11 | 45.46 | 115.2 | 1.94 | 1.32 | 5.39 | 0.63 | 0.20 | 2.25 |
| 12 | 46.49 | 115.5 | 2.18 | 1.38 | 5.21 | 0.60 | 0.20 | 2.25 |
| 13 | 48.88 | 115.8 | 2.86 | 1.55 | 4.87 | 0.55 | 0.20 | 2.25 |
| 14 | 53.25 | 116.7 | 4.70 | 1.79 | 4.23 | 0.44 | 0.20 | 2.25 |
| 15 | 62.53 | 117.3 | 7.44 | 1.72 | 3.08 | 0.36 | 0.20 | 2.25 |
| 16 | 70.03 | 111.1 | 6.66 | 1.13 | 2.16 | 0.26 | 0.20 | 2.25 |

TABLE 3

| Stage | Concentrations in the stages of battery (52) | | | | | | | |
|---|---|---|---|---|---|---|---|---|
| | U(VI) (aq.) | U(VI) (org.) | Pu(IV) (aq.) | Pu(IV) (org.) | $HNO_3$ (aq.) | $HNO_3$ (org.) | flow rate (aq.) | flow rate (org.) |
| 1 | $8.96 \times 10^{-3}$ | $2.51 \times 10^{-2}$ | 4.62 | 1.56 | 1.37 | 0.31 | 0.55 | 0.55 |
| 2 | $3.40 \times 10^{-2}$ | 0.13 | 6.19 | 3.13 | 1.69 | 0.41 | 0.55 | 0.55 |
| 3 | 0.14 | 0.62 | 7.76 | 4.31 | 1.79 | 0.44 | 0.55 | 0.55 |
| 4 | 0.63 | 2.75 | 8.93 | 4.96 | 1.82 | 0.45 | 0.55 | 0.55 |
| 5 | 2.76 | 10.84 | 9.59 | 4.67 | 1.82 | 0.42 | 0.55 | 0.55 |
| 6 | 10.85 | 31.46 | 9.30 | 3.01 | 1.79 | 0.34 | 0.55 | 0.55 |
| 7 | 31.46 | 62.11 | 7.64 | 1.58 | 1.72 | 0.26 | 0.55 | 0.55 |
| 8 | 62.12 | 90.70 | 6.21 | 0.92 | 1.63 | 0.21 | 0.55 | 0.55 |
| 9 | 90.71 | 110.0 | 5.55 | 0.69 | 1.59 | 0.18 | 0.55 | 2.80 |

TABLE 3-continued

| | Concentrations in the stages of battery (52) | | | | | | | |
|---|---|---|---|---|---|---|---|---|
| Stage | U(VI) (aq.) | U(VI) (org.) | Pu(IV) (aq.) | Pu(IV) (org.) | $HNO_3$ (aq.) | $HNO_3$ (org.) | flow rate (aq.) | flow rate (org.) |
| 10 | 105.5 | 111.5 | 3.54 | 0.39 | 1.26 | 0.15 | 0.55 | 2.80 |
| 11 | 113.3 | 113.1 | 1.99 | 0.21 | 1.07 | 0.13 | 0.55 | 2.80 |
| 12 | 121.1 | 114.7 | 1.06 | 0.10 | 0.97 | 0.11 | 0.55 | 2.80 |
| 13 | 129.4 | 116.6 | 0.53 | $4.99 \times 10^{-2}$ | 0.88 | $9.42 \times 10^{-2}$ | 0.55 | 2.80 |
| 14 | 139.1 | 116.5 | 0.24 | $2.03 \times 10^{-2}$ | 0.78 | $7.21 \times 10^{-2}$ | 0.55 | 2.80 |
| 15 | 138.6 | 111.4 | $9.50 \times 10^{-2}$ | $6.84 \times 10^{-3}$ | 0.67 | $5.24 \times 10^{-2}$ | 0.55 | 2.80 |
| 16 | 112.7 | 89.28 | $2.64 \times 10^{-2}$ | $1.65 \times 10^{-3}$ | 0.57 | $3.86 \times 10^{-2}$ | 0.55 | 2.80 |

We claim:

1. Process for the separation of uranium (VI) and/or plutonium (IV) from an aqueous solution, comprising:
  1) contacting the aqueous solution containing uranium(VI) and/or plutonium(IV) with an organic solvent to extract the uranium(VI) and/or plutonium(IV); wherein the organic solvent comprising: a first N,N-dialkyl amide of formula:

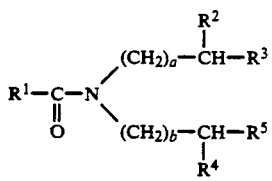

in which $R^1$ is a straight-chain alkyl radical with 1 to 12 carbon atoms or a H radical, $R^2$ and $R^4$, which can be the same or different, are straight or branched alkyl radicals with 2 to 4 carbon atoms, $R^3$ and $R^5$, which can be the same or different, are straight or branched alkyl radicals with 1 to 6 carbon atoms and a and b, which can be the same or different, are integers between 1 and 6 and a second N,N-dialkyl amide of formula:

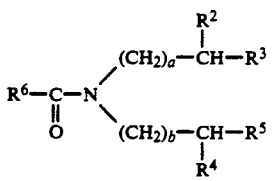

in which $R^2$, $R^3$, $R^4$, $R^5$, a and b have the meanings given hereinbefore and $R^6$ is a branched alkyl radical with 3 to 12 carbon atoms and
  2) separating the organic solvent containing the uranium (VI) and/or the plutonium (IV) from the aqueous solution.

2. Process according to claim 1, wherein the aqueous solution contains nitric acid.

3. Process according to claim 2, wherein the aqueous solution comprises uranium (VI) and plutonium (IV) and the step of contacting the aqueous solution with the organic solvent includes simultaneously extracting uranium (VI) and plutonium (IV) in the organic solvent by providing the nitric acid in the aqueous solution at a concentration of 2 to 8 mole/1.

4. Process according to claim 2, wherein the aqueous solution contains uranium (VI) and plutonium (IV) and the step of contacting the aqueous solution with the organic solvent includes selectively extracting uranium (VI) in the organic solvent and separating it from plutonium (IV) by providing the nitric acid in the aqueous solution at a concentration of 0.1 to 2 mole/1.

5. Process for the treatment of a nitric aqueous solution containing uranium (VI), plutonium (IV) and fission products, comprising the following successive stages:
  1) contacting said nitric aqueous solution with an organic solvent to simultaneously extract uranium (VI) and plutonium (IV) in the organic solvent in a first stage, said organic solvent comprising: a first N,N-dialkyl amide of formula:

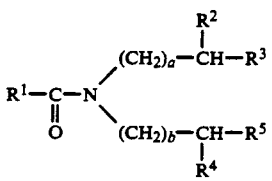

in which $R^1$ is a straight-chain alkyl radical with 1 to 12 carbon atoms or a H radical, $R^2$ and $R^4$, which are the same or different, are straight or branched alkyl radicals with 2 to 4 carbon atoms, $R^3$ and $R^5$, which are the same or different, are straight or branched alkyl radicals with 1 to 6 carbon atoms and a and b, which are the same or different, are integers from 1 to 6 and a second N,N-dialkyl amide of formula:

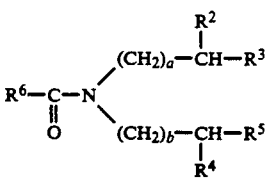

in which $R^2$, $R^3$, $R^4$, $R^5$, a and b have the meanings given hereinbefore and $R^6$ is a branched alkyl radical with 3 to 12 carbon atoms and
  2) separating the plutonium present in the organic solvent obtained at the end of the first stage by contacting said solvent with nitric aqueous solution having a nitric acid concentration of 0.1 to 2 mole/1 for reextracting the plutonium in the nitric aqueous solution in a second stage.

6. Process according to claim 5, including a third stage comprising reextracting the uranium in an aqueous solution by contacting the organic solvent obtained at the end of the second stage with an aqueous solution having a nitric acid concentration of up to 0.2 mole/1.

7. Process according to one of the claims 1 or 5 wherein the first N,N-dialkyl amide complies with the formula:

and in that the second N,N-dialkyl amide complies with the formula:
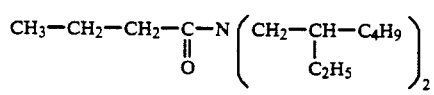
(III)
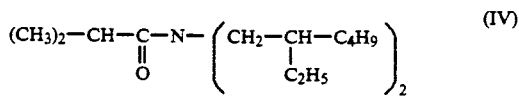
(IV)
8. Process according to one of the claims 1 or 5, wherein the first N,N-dialkyl amide is present in a molar ratio to the second N,N-dialkyl amide in the range of 0.1 to 10.
9. Process according to one of claims 1 or 5, wherein the N,N-dialkyl amides of the organic solvent have a total concentration of 0.2 to 1.7 mole/l.
* * * * *